United States Patent
Pruchniak (12)

(10) Patent No.: US 7,420,459 B2
(45) Date of Patent: Sep. 2, 2008

(54) POWERLINE NETWORKING DEVICE

(75) Inventor: Wayne M. Pruchniak, Jefferson, SD (US)

(73) Assignee: Gateway Inc., Irvine, CA (US)

( * ) Notice: Subject to any disclaimer, the term of this patent is extended or adjusted under 35 U.S.C. 154(b) by 73 days.

(21) Appl. No.: 10/761,988

(22) Filed: Jan. 21, 2004

(65) Prior Publication Data

US 2004/0155722 A1 Aug. 12, 2004

Related U.S. Application Data

(60) Provisional application No. 60/500,181, filed on Sep. 4, 2003, provisional application No. 60/443,078, filed on Jan. 28, 2003.

(51) Int. Cl.
*G08B 11/01* (2006.01)

(52) U.S. Cl. ............. 340/310.01; 340/538; 340/538.15; 340/538.17; 340/310.11; 307/40; 307/39

(58) Field of Classification Search ................ 340/538, 340/538.15, 538.17, 310.11, 310.16, 310.18, 340/310.01; 307/40, 38, 39, 85, 140, 139
See application file for complete search history.

(56) References Cited

U.S. PATENT DOCUMENTS

| 6,445,087 B1 * | 9/2002 | Wang et al. ............... 307/40 |
| 6,466,613 B1 | 10/2002 | Raphaeli et al. |
| 6,741,162 B1 * | 5/2004 | Sacca et al. ............... 307/3 |

* cited by examiner

*Primary Examiner*—Daryl C Pope
(74) *Attorney, Agent, or Firm*—Jeffrey A. Proehl; Woods Fuller Shultz & Smith

(57) ABSTRACT

A powerline network device includes both power suppression and networking functions, and passes through power and data signals. The networking functions can include one or more of hub, router, and/or switch function, and therefore can form a subnet of devices plugged into the outlets of the device.

16 Claims, 1 Drawing Sheet

POWERLINE NETWORKING DEVICE

This application is related and claims priority to U.S. provisional application No. 60/443,078, filed Jan. 28, 2003, entitled "APPARATUS AND METHODS OF NETWORKING DEVICES, SYSTEMS AND COMPUTERS VIA POWER LINES" and U.S. provisional application No. 60/500,181, filed Sep. 4, 2003, entitled "POWERLINE NETWORKING DEVICE", the entireties of both applications being incorporated by reference herein, including all of the documents referenced therein.

BACKGROUND OF THE INVENTION

1. Field of the Invention

The present invention relates to devices, systems, and processes useful as networking devices, and more specifically to powerline networking devices.

2. Brief Description of the Related Art

Power Line Network Adapters (PLNA) is a recent advance in networking technology that uses a building's AC power wiring and circuits to also transmit data signals between computing devices. Typical PLNA networking is done with a module plugged into a wall electrical outlet and then connecting a USB cable (or other type of interface connection, e.g. Ethernet) to the computer. While this type of solution has had some uses, it is not a well integrated solution for systems shipped with networking and requires several user steps in installing.

Some other types of electrical adapters have previously been proposed. For example, U.S. Pat. No. 6,373,377 B1 describes a power supply in a personal computer that incorporates a network interface card (NIC). U.S. Pat. No. 5,510,691 and U.S. Pat. No. 5,466,165 describe AC adapters with power conditioning; APC Corp., of West Kingston, R.I. (among others), offers similar devices on the current market.

Additionally, ethernet routers, hubs, and switches have been commercially available for many years, including powerline routers. FIG. 1 illustrates a typical powerline setup. A modem (DSL or cable, most typically) 12 is connected to the internet 10 and a powerline router 14. The powerline router 14 is plugged into a standard power outlet 16, which is electrically connected to a power circuit 18. A powerline converter 22 is plugged into another outlet 20 on the circuit 18, for example in another room of a building, to which a computing device, e.g. PC 24, is connected via a network connection (wired or wireless).

While presenting some usefulness, this typical arrangement is not very flexible in its configuration, and does not present very robust security options. For example, all computing devices, such as PC 24, connected via powerline converters or adapters 22 to the circuit 18, are on the same network, potentially including computing devices in other buildings (e.g., in a neighboring business or home). Additionally, it is not possible to configure additional networks on the same circuit using prior configurations. Thus, while the typical powerline router 14 may provide some isolation from the internet, it does not provide any isolation from other machines connected to the same power grid, nor does it provide the flexibility to add networks to the power circuit.

While each of the foregoing documents and products proposes solutions to some problems, they do not adequately address security and flexibility problems encountered by users of powerline networks in trying to use powerline technologies.

SUMMARY OF THE INVENTION

According to a first aspect of the invention, a powerline networking device comprises a powerline plug configured and arranged to provide power and network connectivity to and from a power grid, a plurality of powerline outlets in electrical communication with the powerline plug, the plurality of powerline outlets configured and arranged to provide power and powerline networking connections to devices plugged into any of the plurality of powerline outlets, and a networking device between the power line plug and each of the plurality of powerline outlets, the networking device including logic configured to isolate the plurality of powerline outlets from network traffic on the power grid.

According to another aspect of the present invention, a powerline networking device comprises powerline plug means for providing power and network connectivity to and from a power grid, powerline outlet means in electrical communication with the powerline plug means, the powerline outlet means for providing power and powerline networking connections to devices plugged into powerline outlet means, and networking means between the powerline plug means and the powerline outlet means, the networking means for isolating the powerline outlet means from network traffic on the power grid.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
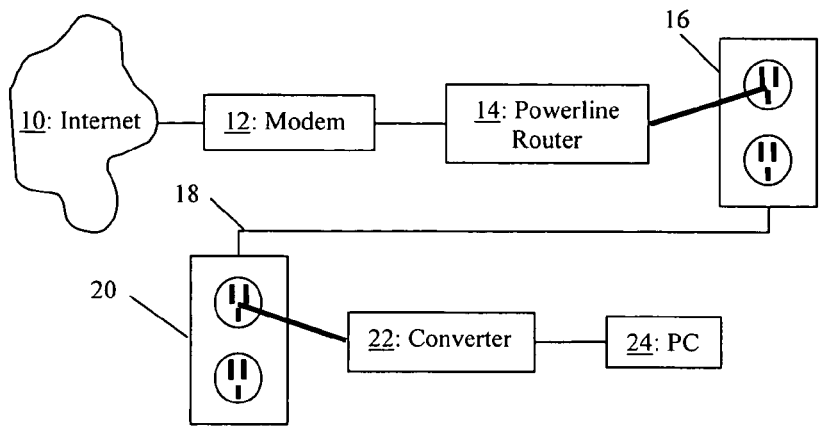
FIG. 1 illustrates a prior powerline network arrangement.

Referring to the drawing figures, like reference numerals designate identical or corresponding elements throughout the several figures.

In the descriptions herein, a familiarity with powerline data network protocols, being within the knowledge of the skilled artisan, is presumed, as is a familiarity with the build and operation of powerline network adapter circuitry, and in particular the HomePlug specifications (see homeplug.org, and ""HomePlug Standard Brings Networking to the Home" by Steve Gardner, Brian Markwalter, and Larry Yonge, incorporated by reference in its entirety herein.), and AC surge suppressor design and construction.

Figure 2:
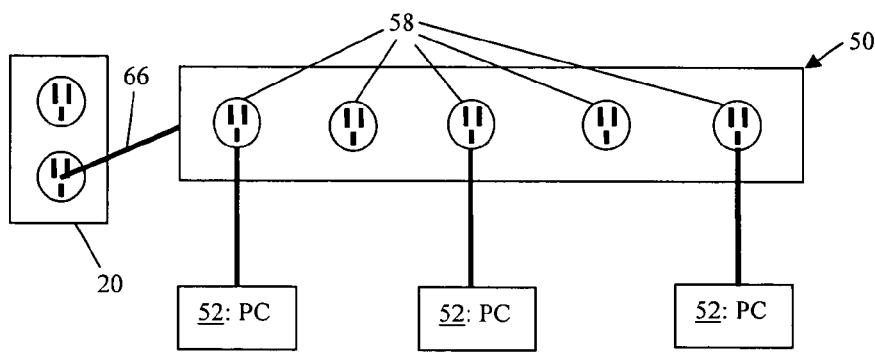
FIG. 2 schematically illustrates a high-level aspect of an exemplary embodiment of the present invention.

FIG. 2 schematically illustrates a high-level aspect of an exemplary embodiment of the present invention. A powerline device 50 in accordance with the present invention is plugged into a power outlet 20 that is connected to an AC power circuit (see FIG. 1) in a known manner, and on which a powerline network has been established, also in a known manner. The device 50 includes at least one, and advantageously a plurality of power outlets 58, into which one or more computing devices (e.g., personal computers, printers, and the like) 52 are plugged. The connections between the computing devices 52 and the powerline device 50 can be any of numerous connections which supply both AC power and a powerline network connection, as will be readily appreciated by those of ordinary skill in the art. It is advantageous to provide a plurality of plugs 58, as described below, to enable the device 50 to be used both to isolate AC power surges and spikes, and to provide networking among and security for the computing devices 52.

Figure 3:
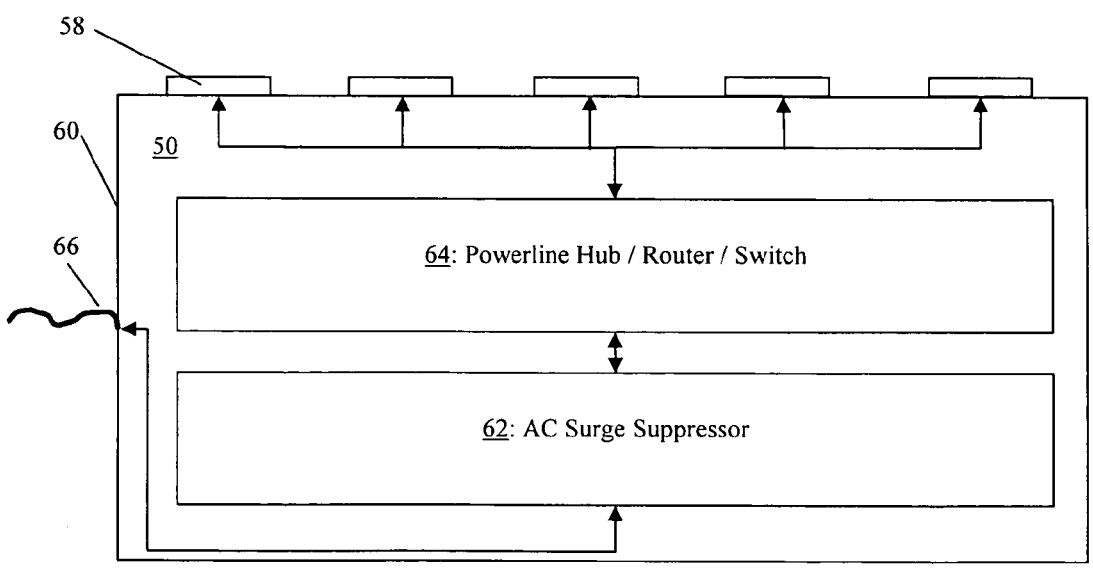
FIG. 3 schematically illustrates more detailed aspects of an exemplary embodiment of the present invention.

FIG. 3 schematically illustrates more detailed aspects of an exemplary embodiment of the present invention. The powerline device 50 includes a housing or enclosure 60 through which the AC power cord 66 extends. The AC power line 66 is connected to an AC surge suppressor unit 62. The unit 62 is then connected to a powerline hub and/or router and/or switch unit 64. The unit 64 is electrically connected to each of the plugs 58.

The powerline device 50 provides all the benefits of traditional ethernet routers, but does not require the entire traditional ethernet hardware infrastructure. Computing devices 52 can be connected to the network with one cable, which supplies both power and network traffic to the device. The powerline device provides AC power and surge suppression to multiple devices, while simultaneously providing protected network traffic between connected devices via the integrated hub/router/switch 64. Connected devices can therefore also be configured to access other powerline networks (including the Internet) across the integrated powerline router. Thus, both conditioned power and filtered network traffic pass through the device 50 to any devices 52 plugged into plugs 58. As will be readily appreciated by those of skill in the art, the devices 52 may include or be connected to a powerline adapter (wired or wireless, not illustrated) that separates out the network data signals and passes them along to the computing device 52, e.g., via an ethernet, USB, or similar data connection; by way of example and not of limitation, such powerline adapters are currently commercially available that comply with the HomePlug specification(s) for powerline networking.

The powerline device 50 integrates AC surge protection, network switching, and network routing in a single device. At one level, the device distributes AC power from a traditional wall outlet to multiple devices 52 that are plugged into it (just as a traditional multi-outlet power strip). Additionally, the device 50, and more particularly the surge suppressor unit 62, senses sudden voltage surges and prevents them from reaching attached devices 52. Additionally, the device 50 is also powerline networking enabled through unit 64, so network traffic can move through the device.

The powerline networking device 64 is optionally segmented. Each of the AC/powerline network ports 58 on the device 50 acts as a network port, further optionally as a switched network port, and the group of AC/powerline network ports acts as a single subnet. Devices 52 connected to the ports 58 on this subnet can therefore transfer data between each other, in a known manner.

This subnet is separated from the other portion of the device 50, which connects to the AC wall outlet 20 and any other powerline networks that are on the same power grid as the device 50. The hub/router/switch unit 64 includes logic so that it can be configured to allow predefined types of network traffic to move between the two subnets, i.e., between the subnet including the computing devices 52 plugged into the plugs 58, and that on the other side of the unit 64. The unit 64 optionally includes logic configured to enable firewall, data encryption, selective parental controls, and similar functions, and logic to present a user interface to allow a user of the unit 64 to configure these functions, such as those currently available in networking devices.

Thus, the powerline device 50 can act like a traditional ethernet hub/router/switch, but without the typical ethernet hardware and connections. Multiple powerline networking-enabled machines can safely share data on the side of the powerline unit 64 downstream of the unit 64, optionally keeping all data from other powerline networks out of the subnet. Because of the configurability of the logic of the device 64, the device 64 can be configured to allow access to other networks, including powerline networks and the Internet, on the upstream side of the device.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A powerline networking device comprising:
   a powerline plug configured and arranged to provide power and network connectivity to and from a power grid;
   a plurality of powerline outlets in electrical communication with the powerline plug, the plurality of powerline outlets configured and arranged to provide power and powerline networking connections to devices plugged into any of the plurality of powerline outlets; and
   a networking device between the powerline plug and each of the plurality of powerline outlets, the networking device including logic configured to isolate the plurality of powerline outlets from network traffic on the power grid;
   wherein the logic configured to isolate the plurality of powerline outlets from network traffic isolates the powerline outlets without removing power from the plurality of powerline outlets.

2. A powerline networking device in accordance with claim 1, further comprising:
   a surge suppression device between the powerline plug and the plurality of powerline outlets.

3. A powerline networking device in accordance with claim 1, further comprising a housing, and wherein the powerline plug and the plurality of powerline outlets are attached to said housing, and said network device is within the housing.

4. A powerline networking device in accordance with claim 1, wherein the network device comprises logic configured to enable the network device to function as a device selected from the group consisting of a network hub, a network router, a network switch, and combinations thereof.

5. A powerline networking device in accordance with claim 1, wherein the networking device is configured to create a subnetwork among any devices connected to the plurality of powerline outlets, the networking device blocking data on the powerline from reaching the subnetwork.

6. A powerline networking device comprising:
   a powerline plug configured and arranged to provide power and network connectivity to and from a power grid;
   a plurality of powerline outlets in electrical communication with the powerline plug, the plurality of powerline outlets configured and arranged to provide power and powerline networking connections to devices plugged into any of the plurality of powerline outlets;
   a networking device between the power line plug and each of the plurality of powerline outlets, the networking device including logic configured to isolate the plurality of powerline outlets from network traffic on the power grid; and wherein the network device comprises logic configured to enable the network device to define a subnet including only devices plugged into the plurality of powerline outlets;

wherein any devices plugged into the powerline outlets on the subnet are isolated from network traffic on the power grid.

7. A powerline networking device comprising:

a powerline plug configured and arranged to provide power and network connectivity to and from a power grid;

a plurality of powerline outlets in electrical communication with the powerline plug, the plurality of powerline outlets configured and arranged to provide power and powerline networking connections to devices plugged into any of the plurality of powerline outlets;

a networking device between the power line plug and each of the plurality of powerline outlets, the networking device including logic configured to isolate the plurality of powerline outlets from network traffic on the power grid;

logic configured to enable firewall, data encryption, selective parental controls, and combinations thereof; and logic configured to present a user interface and to allow a user to configure said firewall, data encryption, selective parental controls, and combinations thereof.

8. A powerline networking device comprising:

powerline plug means for providing power and network connectivity to and from a power grid;

powerline outlet means in electrical communication with the powerline plug means, the powerline outlet means for providing power and powerline networking connections to devices plugged into powerline outlet means; and networking means between the powerline plug means and the powerline outlet means, the networking means for isolating the powerline outlet means from network traffic on the power grid;

wherein the networking means isolates isolates the powerline outlets without removing power from the plurality of powerline outlets.

9. A powerline networking device in accordance with claim 8, further comprising:

surge suppression means between the powerline plug means and the powerline outlet means.

10. A powerline networking device in accordance with claim 8, further comprising enclosure means, and herein the powerline plug means and the powerline outlet means are attached to said enclosure means, and said networking means is within the enclosure means.

11. A powerline networking device in accordance with claim 8, wherein the networking means is further for functioning as a device selected from the group consisting of a network hub, a network router, a network switch, and combinations thereof.

12. A powerline networking device in accordance with claim 8, wherein the networking means is configured to create a subnetwork among any devices connected to the powerline outlet means, the networking means blocking data on the powerline from reaching the subnetwork.

13. A powerline networking device comprising:

powerline plug means for providing power and network connectivity to and from a power grid;

powerline outlet means in electrical communication with the powerline plug means, the powerline outlet means for providing power and powerline networking connections to devices plugged into powerline outlet means;

networking means between the powerline plug means and the powerline outlet means, the networking means for isolating the powerline outlet means from network traffic on the power grid;

wherein the networking means comprises means for defining a subnet including only devices plugged into the powerline outlet means;

wherein any devices plugged into the powerline outlet means on the subnet are isolated from network traffic on the power grid.

14. A powerline networking device comprising:

powerline plug means for providing power an network connectivity to and from a power grid;

powerline outlet means in electrical communication with the powerline plug means, the powerline outlet means for providing power and powerline networking connections to devices plugged into powerline outlet means;

networking means between the powerline plug means and the powerline outlet means, the networking means for isolating the powerline outlet means from network traffic on the power grid;

means for enabling a firewall, data encryption, selective parental controls, and combinations thereof; and means for presenting a user interface and allowing a user to configure said firewall, data encryption, selective parental controls, and combinations thereof.

15. A powerline networking device comprising:

a powerline plug configured and arranged to provide power and network connectivity to and from a power grid;

a plurality of powerline outlets in electrical communication with the powerline plug, the plurality of powerline outlets configured and arranged to provide power and powerline networking connections to devices plugged into any of the plurality of powerline outlets; and a networking device between the powerline plug and each of the plurality of powerline outlets, the networking device including logic configured to isolate the plurality of powerline outlets from network traffic on the power grid;

wherein the logic configured to isolate the plurality of powerline outlets from network traffic does not isolate the powerline outlets from power from the power grid.

16. A powerline networking device comprising:

a powerline plug configured and arranged to provide power and network connectivity to and from a power grid;

a plurality of powerline outlets in electrical communication with the powerline plug, the plurality of powerline outlets configured and arranged to provide power and powerline networking connections to devices plugged into any of the plurality of powerline outlets; and a networking device between the powerline plug and each of the plurality of powerline outlets, the networking device including logic configured to isolate the plurality of powerline outlets from network traffic on the power grid;

wherein the logic configured to isolate the plurality of powerline outlets from network traffic does not prevent power from the power grid from reaching the powerline outlets.

* * * * *